United States Patent [19]

Littau

[11] Patent Number: 4,974,405
[45] Date of Patent: Dec. 4, 1990

[54] HARVESTER WITH ROTATIONALLY OSCILLATABLE CYLINDRICAL SHAKERS

[76] Inventor: Eugene G. Littau, 8974 Shaw Square Rd., SE., Aumsville, Oreg. 97325

[21] Appl. No.: 417,891

[22] Filed: Oct. 6, 1989

[51] Int. Cl.[5] .......................................... A01D 46/00
[52] U.S. Cl. .................................................... 56/330
[58] Field of Search ................... 56/330, 329, 340.1, 56/DIG. 6, 328.1

[56] References Cited

U.S. PATENT DOCUMENTS

| | | | |
|---|---|---|---|
| 3,344,591 | 10/1967 | Christie et al. | 56/330 |
| 3,705,486 | 12/1972 | Chen et al. | 56/330 |
| 3,822,537 | 7/1974 | Sell | 56/330 |
| 4,085,572 | 4/1978 | Bruel | 56/330 |
| 4,860,529 | 8/1989 | Peterson et al. | 56/330 |

Primary Examiner—Stephen J. Novosad
Attorney, Agent, or Firm—Kolisch, Hartwell & Dickinson

[57] ABSTRACT

A fruit harvester with a pair of opposed, rotatable shaker members. A power-driven oscillatable member is associated with each shaker member. Power-transmitting means including slippage means interconnects an oscillatable member and its associated shaker member.

9 Claims, 4 Drawing Sheets

4,974,405

HARVESTER WITH ROTATIONALLY OSCILLATABLE CYLINDRICAL SHAKERS

BACKGROUND AND SUMMARY OF THE INVENTION

This invention relates to a fruit harvester of the type which includes a mobile frame adapted to travel over the ground, and a rotatable shaker member supported on this mobile frame adapted during travel of the frame to engage the growth supporting the fruit and to shake this growth whereby the fruit falls free. A common form of such harvester is a so-called berry harvester, which includes a pair of opposed rotatable shaker members positioned to engage opposite sides of a row of berry plants as the harvester moves along the rows.

In a common form of harvester, and as exemplified by the harvester disclosed in Christie et al., U.S. Pat. No. 3,344,591, so-called free-wheeling shaker members are provided disposed opposite each other which are rotated by engagement with the plants being processed and as the harvester travels along the row, so that the peripheral speed of the shakers is essentially the travel speed of the harvester along the ground. Superimposed on this free-wheeling rotary movement is an oscillatory movement in each of the shakers, whereby such rotates back and forth over a short arc, with the imparting of a shaking movement to the plants processed. In Christie et al., this shaking movement, also described as an ocillatory vibration, might be at a frequency of a thousand cycles per minute, and with the amplitude of vibration being in the range of an inch or less.

Generally speaking, in harvesters having rotatable, free-wheeling shakers with vibratory movement superimposed upon the movement of the shakers, vibration frequency tends to be relatively high, there is a limited amount of control in the back and forth movement in which a shaker partakes, and shaking characteristics tend to be adversely affected by traveling through heavy material.

A general object of this invention is to provide an improved fruit harvester which includes a rotatable shaker which may be operated effectively with a lower oscillation rate in the shaker.

Another object is to provide an improved fruit harvester where the amplitude of oscillation in a rotatable shaker may be selected to be considerably larger than typical oscillation amplitudes known in the past.

A further object is to provide a harvester which affords greater control by the operator of the back and forth oscillatory movement in a shaker.

Another object is to provide a harvester with a rotatably mountable oscillating shaker, where the shaker is not free-wheeling but may be rotated under power to have a net circumferential motion which equals that of the speed of the harvester over the ground.

A further object is to provide a harvester which includes an oscillatable member which is powered back and forth by motor, and power-transmitting means connecting this oscillatable member with a rotatable shaker which includes slippage means allowing controlled relative slippage between movement of the oscillatable member and movement of the shaker.

Yet another object is to provide such a harvester where the slippage is adjustable. More particularly, the slippage is adjustable with the oscillatable member rotated in one direction and also adjustable with the oscillatable member rotated in the opposite direction, and one of these adjustments may be made independently of the other.

A further object is to provide such a harvester where the slippage means comprises a rotary hydraulic pump, with valving interposed between inlet exhaust sides of the pump adjustable to control the extent to which casing movement follows rotor movement, with the rotor angularly shifted in either of opposite directions.

BRIEF DESCRIPTION OF THE DRAWINGS

These and other objects and advantages are obtained by the invention, which is described herein below in conjunction with the accompanying drawings, wherein.

DETAILED DESCRIPTION OF A PREFERRED EMBODIMENT

Figure 1:
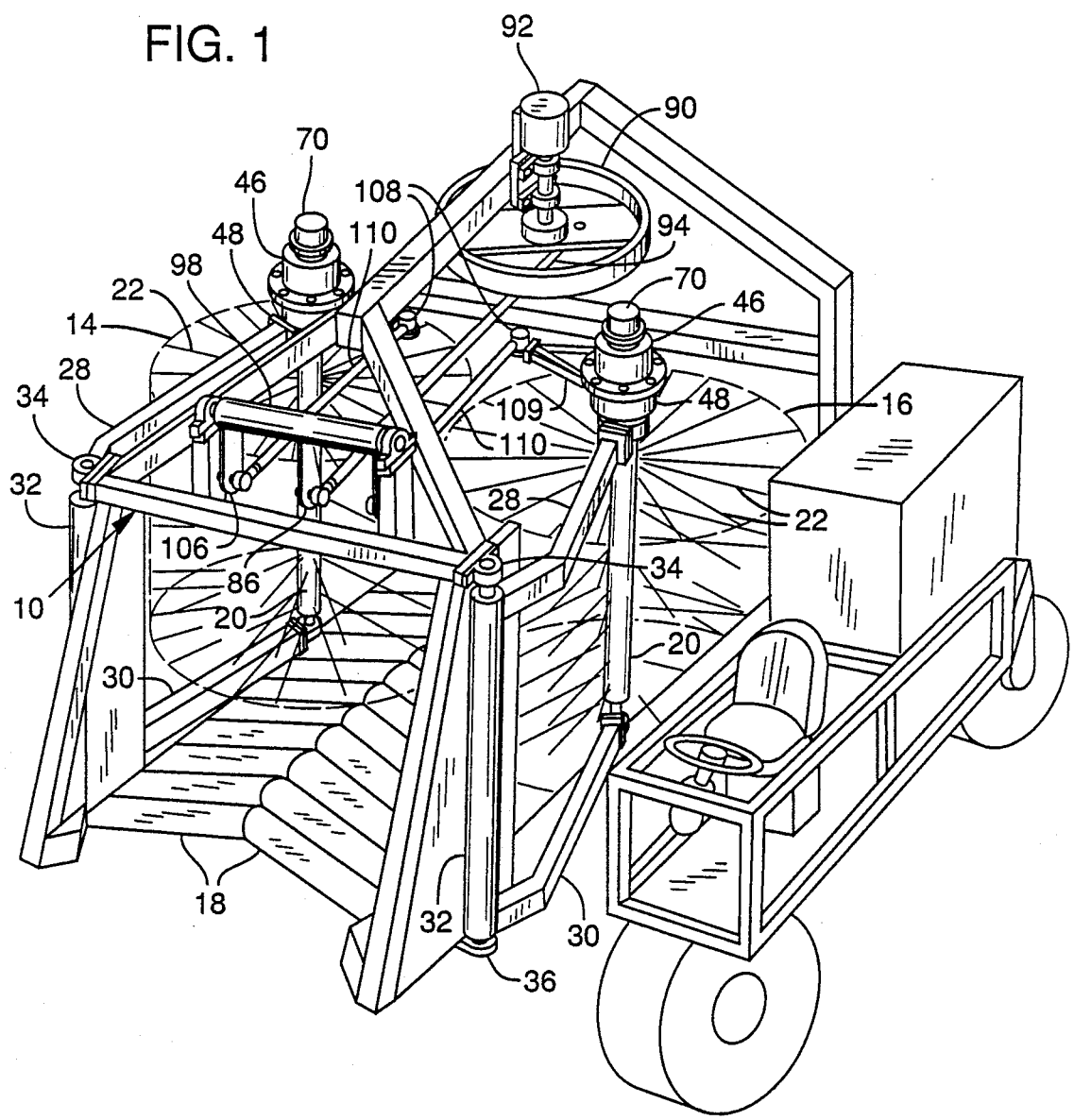
FIG. 1 is a perspective simplified view of a berry harvester incorporating the invention.

Referring now to the drawings, the fruit harvester illustrated takes the form of a berry harvester such as may be used for harvesting raspberries. The harvester includes a vehicle frame 10 (refer to FIG. 1) supported by suitable wheels such as those shown at 12 for movement over the ground. The frame arches over and extends downwardly on opposite sides of the row of plants from which fruit is harvested. Supported by the frame are opposed shaker members 14, 16 of substantially cylindrical outline. These are supported with their axis substantially upright or vertical.

The harvester is provided with a suitable motor-powered means, such as a gasoline and drive transmission, coupled to one or more of the wheels and operated to move the harvester over the ground. Fruit dislodged by the shakers is collected and conveyed by suitable means, including the yieldable deflecting plates 18 provided adjacent the base of the harvester. Details of the harvester, other than those having to do with the shakers and how such are moved, are shown in simplified form or omitted, as these form no part of the invention and may take any of various conventional or suitable forms.

Figure 5:
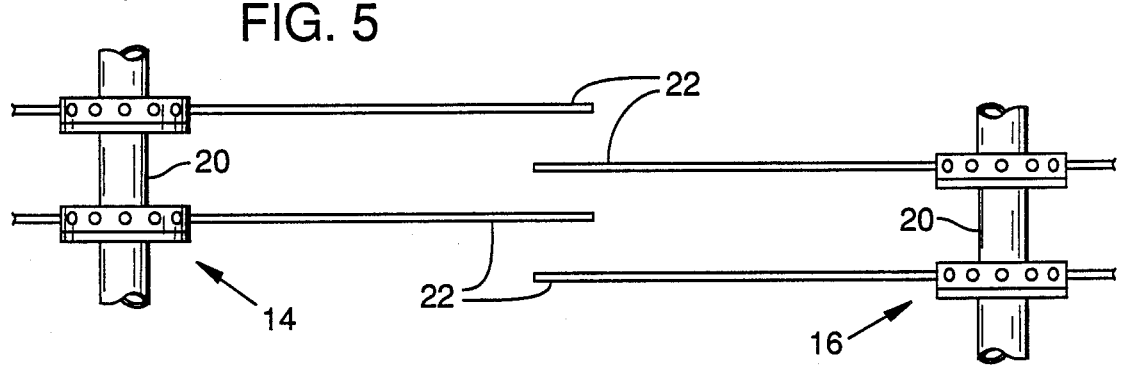
FIG. 5 is an enlarged view illustrating portions of opposed shaker members.

Each shaker members, and referring to FIG. 5, includes an elongate tubular portion 20 extending along the center thereof. Suitably secured to this tubular portion, and projecting radially outwardly therefrom, are elongate, flexible fingers 22, ordinarily made of a suitable plastic material. In the harvester illustrated, a plurality of these fingers are present in each of different levels or tiers of fingers distributed along the length of portion 20.

The fingers are of a sufficient length as to be capable of insertion into the vines or canes of the berry plants to a depth assuring that all portions of these vines or canes are subjected to the vibratory action imparted to the fingers. As will be further described, the shaker members are mounted so as to be moveable laterally from each other when encountering a post or other obstruction as the harvester moves along the field. However, with the shaker members in their relatively innermost positions, the fingers of one shaker member slightly overlap the finger members of the opposing shaker member. By having the tiers of fingers of one member staggered with respect to the tiers of the other, clearance is provided whereby one shaker member may rotate without impairing rotation of the other.

Figure 2:
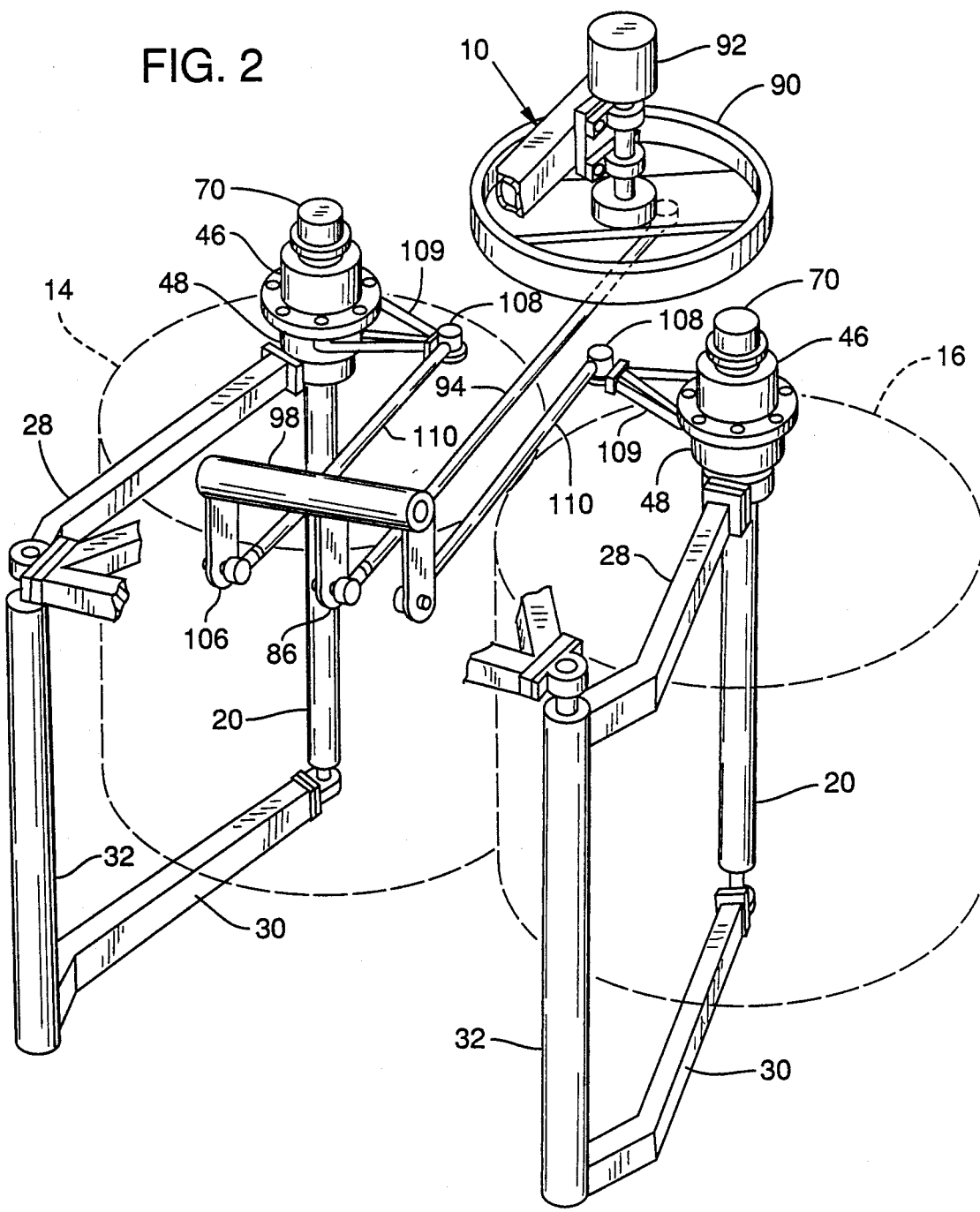
FIG. 2 is a perspective view, showing shaker members in the harvester, and how they are powered.

Considering the mounting of a shaker member, and referring to FIG. 2, associated with each member is arm structure including an upper arm 28 and a lower arm 30. An end of each of these arms joins with an upstanding interconnecting rod portion 32. Opposite extremities of tubular portion 20 in a shaker member are suitably rotatably journaled on the extremities of upper and lower arms 28, 30, with the mounting enabling the shaker members to rotate about its axis. The arm structure is journaled, as at 34, and 36, to enable pivoting of the arm structure about an upright axis which is parallel to, but spaced laterally from, the axis of the shaker member supported in the arm structure.

Figure 3:
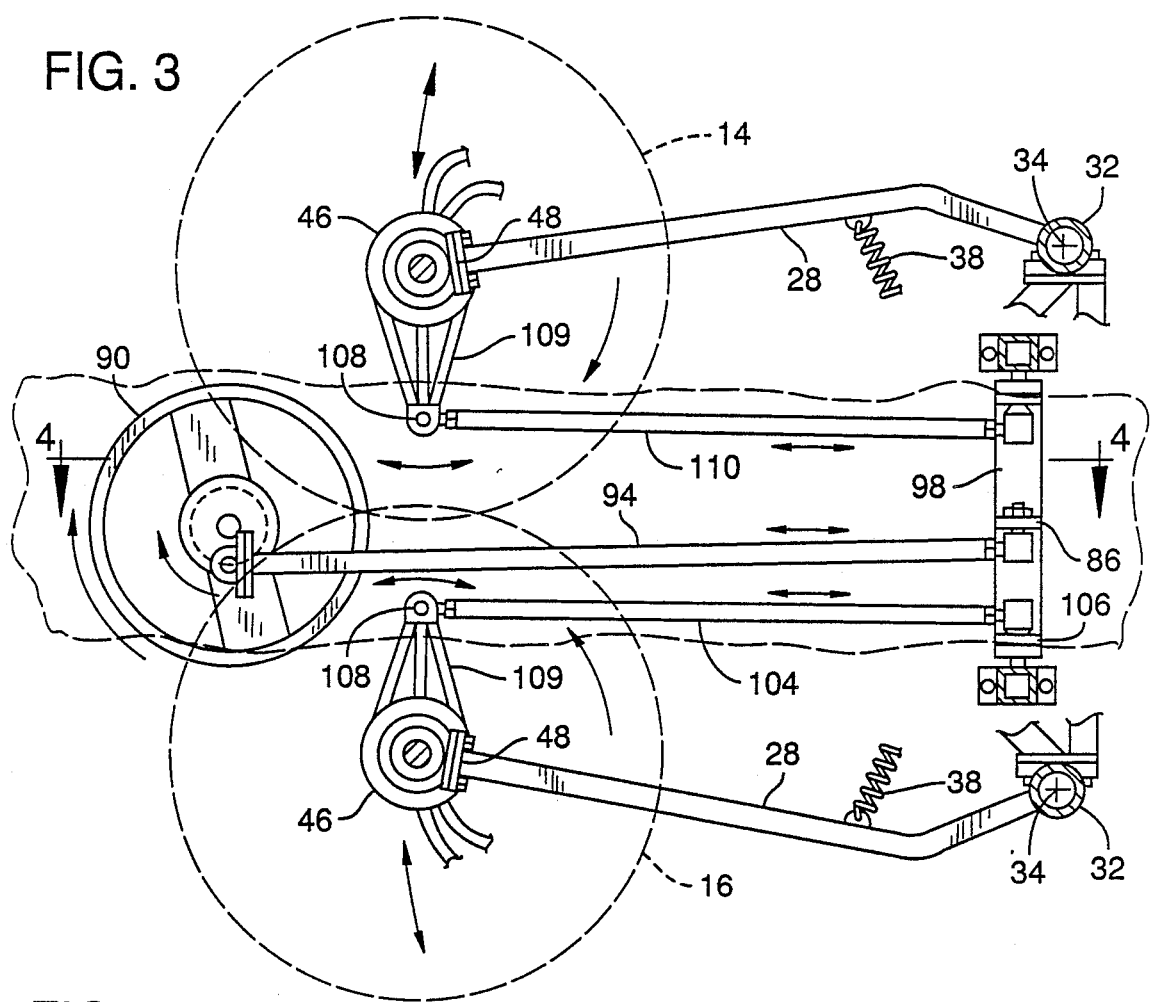
FIG. 3 is a view, taken generally along the line 3—3 in FIG. 2, looking upwardly at the means provided for powering the shaker members.

With the structure described, each arm structure is swingable to shift the shaker member which it supports from an innermost position for the shaker member, illustrated in FIG. 3, outwardly to, for instance, the position shown for member 14 in FIG. 3 at 14A. Resisting such movement is flexible biasing means, such as the spring shown at 38, interposed between each arm structure and the frame of the harvester. With such movement afforded the shaker members, they can shift away from each other, as when necessary to clear a post or other obstruction encountered by the harvester during the harvesting of fruit.

In the harvester herein disclosed, each of the shaker members is provided with a rotatably mounted oscillatable member which, during operation of the harvester, is swung back and forth about its rotation axis, thus to have imparted thereto rotary oscillatory movement. Power-transmitting means is provided, interconnecting this oscillatable member with the shaker member, and this power-transmitting means includes slippage means which is adjustable to vary the force level at which slippage or relative displacement occurs between the oscillatable member and the shaker member. Further, this adjustment means permits adjustment of this force level with the oscillatable member moving in one direction or with the oscillatable member moving in the opposite direction, and it is possible to make a change in one direction without producing a change in the other. This permits the harvester to be set up, for instance, in one mode, wherein the shaker member is advanced in increments almost in ratchet fashion, with little if any movement in a return direction between advancing direction movements. In another type of adjustment, the force producing movement in one direction may be almost the same as the force producing movement in the other. This slippage means is incorporated into the harvester utilizing a fluid coupling device and adjustment valves, as will now be discussed.

Figure 4:
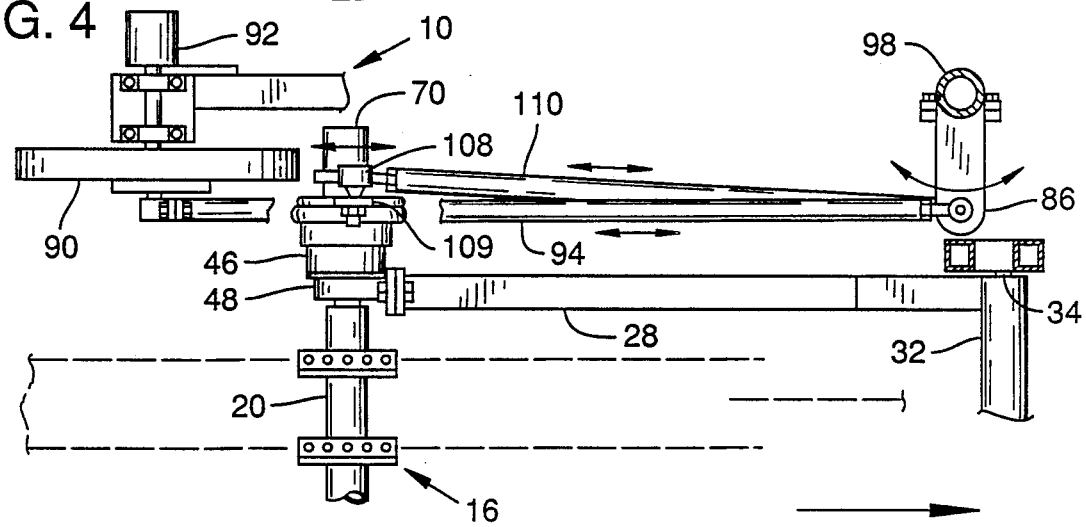
FIG. 4 is a view taken generally along the line 4—4 in FIG. 3.
Figure 6:
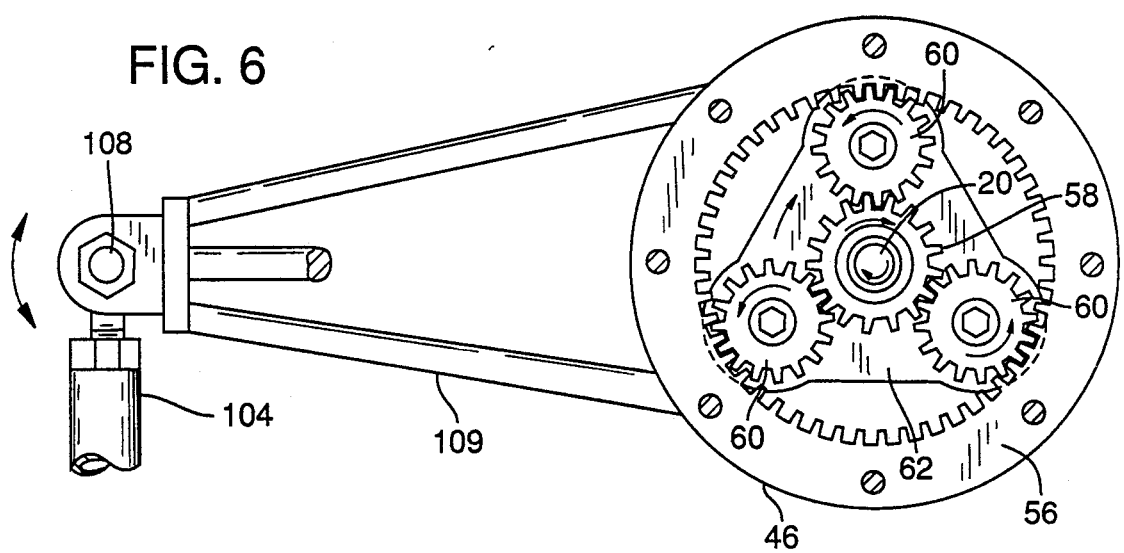
FIG. 6 is an enlarged view illustrating an oscillatable member.

Considering a member 16, and referring to FIGS. 2, 3, and 4, indicated at 46 is the housing of a planetary transmission. This housing is rotatably supported adjacent its base on upper arm 28, through clamp and bearing structure 48. The planetary transmission, as is conventional with such a gear reduction unit, and as shown in FIG. 6, includes a ring gear 56 fixedly secured within the housing. Within the ring gear is a rotatably mounted sun gear 58. Meshing with the ring and sun gears are planet gears 60, these being rotatably supported on a planet gear mounting 62.

A shaker member, as earlier described, is rotatably supported in arms 28 and 30 of the arm structure. The rotatable mounting for the upper end of the shaker member is attained through suitably securing tubular portion 20 to planet gear mounting 62 whereby the two rotate as one. The usual bearings rotatably supporting the planeting gear mounting within the transmission housing provide the rotatable support for the upper end of the shaker member.

Figure 7:
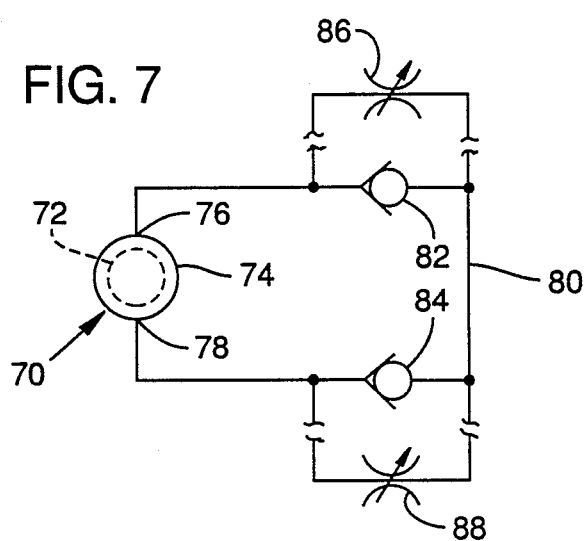
FIG. 7 illustrates schematically a fluid coupling device.

Shown as 70 is what is referred to herein as a fluid coupling device. In essence, such may take the form of a reversible rotary hydraulic pump, which includes an internal relatively rotatably mounted rotor 72 (see FIG. 7) relatively rotatably mounted within an outer casing or chamber-defining member 74. Ports to the unit are shown in 76, 78, with port 76, for instance, being an inlet port with the rotor rotated in one direction and port 78 then serving as a discharge port. With reverse rotation of the rotor, port 78 becomes an inlet port and port 76 a discharge port.

Casing 74 of the fluid coupling device is suitably secured to housing 46 of the planetary transmission. Sun gear 58 earlier described and present in the planetary transmission is connected to rotor 72.

A hydraulic system is provided with adjustable valves and check valves interconnecting ports 76, 78, in the fluid coupling device. Thus, and referring to FIG. 7, a conduit 80 extends between these ports. A check valve 82 in this conduit accommodates flow to the right in FIG. 7, but blocks it in the reverse direction. Another check valve 84 in this conduit accommodates flow to the right in FIG. 7, but again blocks reverse flow. An adjustable valve 86 is adjustable to provide a bypass passage around check valve 82. Similarly, an adjustable valve 88 is adjustable to provide a bypass passage around check valve 84.

As will be further described, mechanism is provided for rotatably oscillating the planetary transmission housing back and oscillatory movement is permitted by clamp and bearing structure 48 which mounts the housing, and the rotation is about an axis which corresponds to the axis of a shaker member. The planetary transmission housing, therefore, is also referred to herein as an oscillatable member.

From the description herein, it should be obvious that with adjustable bypass valves 86, 88 both closed to prevent any passage around the check valves 82, 84 a hydraulic lock is established preventing any relative movement of rotor 72 within casing 74. This results in the sun gear 58 being held immobile within the transmission housing. With the transmission housing oscillated, the oscillatory movement is transmitted through the planet gear mounting directly to the shaker member 14.

Describing another situation, if valve 88 is left fully opened and valve 86 closed, rotor 72 can rotate freely in one direction, which is the direction which fluid flows from port 76 into port 78. In the opposite direction, however, the rotor cannot rotate but is locked hydraulically to the casing. With this adjustment, oscillations in the planetary transmission housing are only partially transmitted to the shaker member. That is to say, oscilatory movement in one direction occurs but there is no return movement in the opposite direction. What appears to be stepwise movement in the shaker member results. Opening valve 86 and closing valve 88 will produce a stepwise movement, but in the opposite direction. Obviously, an infinite number of adjustments are possible, with valves 86, 88 adjustable between fully opened and fully closed positions.

Shown at 90, and referring to FIGS. 3 and 4, is a flywheel rotatably mounted on the frame of the vehicle and rotated under power utilizing, for instance, the motor shown at 92. A crank arm 94 mounted eccentrically on the flywheel has its opposite relatively pivotally joined to the end of a lug 86 projecting downwardly from a rock shaft 98. The rock shaft is suitably journaled on the frame.

A shaft 104 has one end journaled to the lower end of a lug 106 depending from the rock shaft. The opposite end of this shaft is connected through a universal swivel joint 108 and strut structure 109 to oscillatory member 46 of shaker member 16.

A similar structure including shaft 110 interconnects the rock shaft to the oscillatable member associated with shaker member 14.

With the flywheel rotated through operation of motor 92, rock shaft 98 is rotated back and forth about its axis. This oscillatory movement in turn is transmitted through the shafts 104, 110 to the oscillatable members associated with the respective shaker members.

Motor 92 is a variable speed motor, so by increasing its speed the frequency of oscillation may be increased.

By including the planetary transmission, in effect interposed between the oscillatable member, i.e., the housing, and fluid coupling device 70, torque levels in the coupling device are reduced. This permits use of a smaller sized coupling device, not otherwise possible without excessive wear occurring in the parts.

Describing a typical operation, the harvester might be caused to move along a row of berry bushes at a speed of one mile an hour. With shaker members 14, 16 having an overall radius of two feet, a circumference of approximately 150 inches results in these shaker members. For the shaker members to have circumferential motion whereby they travel in the direction of the plants passing thereby at an overall speed of one mile an hour requires that such be rotated at a speed of about 7 revolutions per minute. With an oscillating frequency of 300 oscillations per minute, and with adjustments in valve 86, 88 wherein, in essence, transmitted oscillatory movement is in one direction only, i.e., the direction of travel of the plants, the shaker members should have their peripheries travel about 3 ½ inches for each oscillation that occurs.

It should be apparent that the harvester contemplated has a number of desirable features. The shaker members can be caused to advance under power at approximately the speed required to keep the members up with the bushes as they travel. This tends to minimize damage to the bushes. It is possible to impart to the shaker members oscillations of substantially greater amplitude than previously possible. The frequency of oscillations can be substantially lower than those commonly characterizing known harvesting equipment. Through adjustment of the valves 86, 88 and the slippage that results from such an adjustment, considerable flexibility is afforded in the way that the harvester operates and the type of action that is imparted to the shaker members.

While a particular embodiment of the invention has been described, obviously variations and modifications are possible.

It is claimed and desired to secure by letters patent:

1. In a fruit harvester which includes a mobile frame and a shaker member rotatably mounted on said frame, the shaker member having means for engaging growth supporting the fruit being harvested,
    a motor supported on the frame,
    an oscillatable member rotatably mounted on the frame,
    means connecting the motor and said oscillatable member whereby operation of the motor produces powered oscillating of the oscillatable member by the motor, and
    power-transmitting means interconnecting the oscillatable member and shaker member whereby powered oscillating of the oscillatable member produces powered oscillating of the shaker member about its rotation axis, the power-transmitting means incluidng slippage means allowing relative slippage between the movement of the oscillatable member and movement of the shaker member.

2. The harvester of claim 1, wherein the slippage means is adjustable to adjust the relative slippage allowed.

3. The harvester of claim 1, wherein said slippage means with the oscillatable member moving in one direction affords a greater degree of slippage with respect to the shaker member than is afforded with the oscillatable member moving in the opposite direction.

4. The fruit harvester of claim 3, wherein the slippage means is adjustable to change the slippage afforded between the oscillatable member and the shaker member with the oscillatable member moving in one direction. and also is adjustable to change the slippage afforded between oscillatable member and the shaker member with the oscillatable member moved in the opposite direction, and wherein the two adjustments may be made independently of each other.

5. The fruit harvester of claim 1, wherein said slippage means comprises a rotary pump including relatively rotatable rotor and stator portions, one of said portions moving with the oscillatable member and the other of said portions moving with the shaker member.

6. In a fruit harvester which includes a mobile frame movable over the ground,
    a pair of generally cylindrical shaker members positioned with the axis of the members upright and operable to engage opposite sides of a row of fruit plants,
    supporting arm structure for each shaker member and means rotatably mounting each shaker member on an arm structure for rotation of the shaker member about its axis,
    pivot means for each arm structure pivotally mounting the arm structure for pivotal movement about an upright axis whereby the shaker members may move toward and away from each other,
    an oscillatable member rotatably mounted on each arm structure for rotary oscillatory movement about the axis of the shaker member which is mounted on the arm structure,
    motor-driven means connected to said oscillatable member for producing oscillatory movement of the oscillatable member, first in one and then in the opposite direction, and slippage means interconnecting oscillatable member and the shaker member on an arm structure, the slippage means enabling relative slippage between the oscillatable member and the shaker member with the oscillatable member rotating in one direction.

7. The fruit harvester of claim 6, wherein said slippage means comprises a rotary pump including relatively rotatable rotor and stator portions, valve means interconnecting the outlet ports of said pumps controlling relative ease of the rotation of these portions in said one and said opposite directions, means connecting for simultaneous rotation one of said portions with the shaker member and means connecting for simultaneous rotation the other of said portions with the oscillatable member.

8. The fruit harvester of claim 7 wherein the means connecting one of said portions to the shaker member includes reduction gear mechanism.

9. A fruit harvester which includes a movable frame movable over the ground, a generally cylindrical shaker member positioned with the axis of the member upright and the member being operable to engage the side of a row of fruit plants, a supporting arm structure for the shaker member pivotally mounted on the frame and means rotatably mounting the shaker member on the supporting arm structure for rotation of the shaker member about its axis, an oscillatable member rotatably mounted on the arm structure for rotary oscillatory movement about the axis of the shaker member, motor-driven means connected to the oscillatable member for producing oscillatory movement of the oscillatable member first in one and then in the opposite direction, and slippage means interconnecting the oscillatable member and shaker member enabling relative slippage between the two members with the oscillatable member rotating in one direction.

* * * * *